United States Patent [19]

Veaux et al.

[11] Patent Number: 4,630,788
[45] Date of Patent: Dec. 23, 1986

[54] AIRCRAFT LANDING GEAR, IN PARTICULAR FOR HELICOPTERS

[75] Inventors: Jacques Veaux, Chatillon; Michel Derrien, Versailles, both of France

[73] Assignee: Messier-Hispano-Bugatti (S.A.), Montrouge, France

[21] Appl. No.: 666,170

[22] Filed: Oct. 29, 1984

[30] Foreign Application Priority Data

Nov. 9, 1983 [FR] France .................. 83 17778

[51] Int. Cl.$^4$ .................................. B64C 25/60
[52] U.S. Cl. .................... 244/104 FP; 244/104 R; 244/102 SS; 244/102 A; 244/100 R; 188/297
[58] Field of Search ............... 244/50, 100 R, 104 FP, 244/104 R, 102 A, 102 SS, 102 R; 188/297

[56] References Cited

U.S. PATENT DOCUMENTS

| | | | |
|---|---|---|---|
| 2,712,422 | 7/1955 | Gerwig | 244/50 |
| 3,401,577 | 9/1968 | Partridge | 244/50 |
| 4,291,850 | 9/1981 | Sharples | 244/104 FP |

FOREIGN PATENT DOCUMENTS

| | | | |
|---|---|---|---|
| 568 | of 1915 | United Kingdom | 244/104 FP |
| 486310 | 6/1938 | United Kingdom | 244/104 FP |

Primary Examiner—Trygve M. Blix
Assistant Examiner—Mark R. Valliere
Attorney, Agent, or Firm—McAulay, Fields, Fisher, Goldstein & Nissen

[57] ABSTRACT

The landing gear comprises: a rod including nested first and second tubes between which there slides a cylinder whose outer end supports a running gear; a strut surrounding the top of the rod and including a steering mechanism cooperating with a rotary tube disposed between the rod and the strut; and a fluid actuator constituted by at least one chamber between the strut and the rod and having a feed inlet only. The landing gear is particularly applicable to helicopters that are required to "kneel down" camel fashion, e.g., for storage in the hold of an aircraft carrier or a cargo plane.

17 Claims, 2 Drawing Figures

AIRCRAFT LANDING GEAR, IN PARTICULAR FOR HELICOPTERS

The present invention relates to a landing gear for aircraft, and more particularly for helicopters that may be embarked on board ships such as aircraft carriers or on board cargo planes.

BACKGROUND OF THE INVENTION

In order to ensure that helicopters occupy a minimum amount of space when stored in a hold or a hangar for example, it is necessary to reduce the volume they occupy. To do this, the landing gear needs to be equipped with means enabling it to be collapsed. Such means also have the advantage of increasing helicopter stability by reducing the ratio of the height of the center of gravity to the size of the footprint. In addition, in order to facilitate maneuvering such helicopters on the ground or on deck, it is desirable for them to be fitted with a steering gear controllable from the cockpit.

Preferred embodiments of the present invention provide a landing gear, and more particularly, a front landing gear for helicopters, capable of performing three functions: shock absorbing; steering; and kneeling or collapsing to lower the helicopter somewhat like a camel.

SUMMARY OF THE INVENTION

The present invention provides for an aircraft landing gear, in particular for helicopters, the landing gear comprising:

a rod comprising first and second nested tubes interconnected at one of their ends by a common end plate, the first tube being of larger diameter than the second tube;

a cylinder slidably mounted between the nested tubes and supporting running means at one of its ends, the rod and the cylinder co-operating to constitute shock-absorber means;

a strut disposed substantially around the rod and including steering means, one end of the strut being suitable for fixing thereof to the structure of the aircraft;

a rotary tube disposed between the strut and the first tube and suitable for co-operating with the steering means of the strut; and fluid jack means constituted by at least one chamber defined between the strut and the first tube, the chamber having a feed inlet only.

Advantageously the fluid jack means additionally include a second chamber defined by a separator piston free to move inside the second nested tube between an internally projecting shoulder in the tube and the common end plate, the second chamber having a feed inlet only.

BRIEF DESCRIPTION OF THE DRAWINGS

An embodiment of the invention is described by way of example with reference to the accompanying drawings, in which.

MORE DETAILED DESCRIPTION

Figure 1:
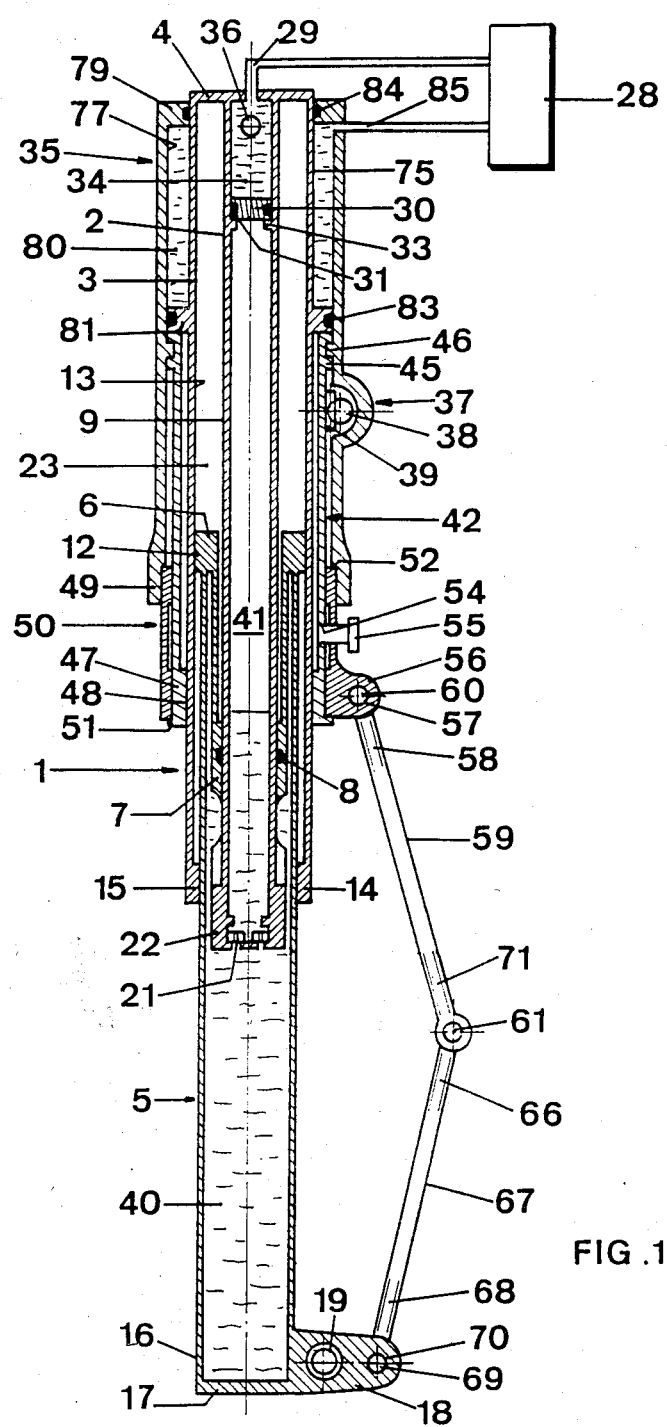
FIG. 1 is a diagrammatic longitudinal section through landing gear in accordance with the invention in the fully extended position, ie. prior to coming into contact with the ground.

This front landing gear, in particular for a helicopter, comprises a rod 1 defined by two nested tubes 2 and 3 which are interconnected by a common end plate 4.

The rod 1 receives the open end 6 of a cylinder 5 which is suitable for sliding in the annular space 23 defined between the two tubes 2 and 3.

More precisely, the open end 6 of the cylinder 5 is shaped in such a manner that a first bearing surface 7 having a sealing ring 8 is in contact with the outside diameter 9 of the inner tube 2, while a second bearing surface 12 is in contact with the inside diameter 13 of the outer tube 3.

Further, the open end 14 of the outer nested tube 3 has a bearing surface 15 in contact with the outer diameter of the cylinder 5. Thus, the cylinder 5 is guided relative to the rod 1 by the contact provided by three bearing surfaces: 7, 12 and 15.

The cylinder 5 encloses a fluid chamber 40 which is in communication with a chamber 41 in the inside volume of the inner nested tube 2 via throttling means such as slow-return valves 21 provided in the end 22 of the tube 2.

The cylinder 5 and the rod 1 thus constitute a shock absorber for the landing gear.

The other end 16 of the cylinder 5 is closed by an end plate 17 having a radially projecting lug 18 serving to support a shaft 19 on which the helicopter running gear is mounted. The running gear may be constituted by one or two wheels in conventional manner and is not shown in the figures.

A separator piston 30 is located in the upper part of the chamber 41 in the tube 2. This piston 30 has a sealing ring 31 suitable for sliding along the inside diameter of the tube, and as can be seen in FIG. 1, it rests on an inwardly projecting shoulder 33 on the inner nested tube 2. An upper chamber 34 is thus defined between the separator piston 30 and the end plate 4 of the rod 1, and an orifice 29 provides fluid communication between the chamber 34 and a hydraulic unit 28.

The landing gear further includes a strut 35 surrounding the rod 1, and more particularly surrounding the outer nested tube 3. The strut 35 is pivotable relative to the structure of the helicopter about an axis 36. The strut encloses the landing gear's steering means 37 which are constituted by a rotary tube 42 having a circular toothed or pinion portion 39 which engages a rack 38. The tube 42 is retained at its upper end 45 by means of an inwardly directed shoulder 46 on the strut engaging a groove in the end 45. The lower end 47 of the rotary tube 42 has a bearing surface 48 suitable for sliding freely over the outer nested tube 3 of the rod 1.

A rotary sleeve 50 is disposed between the lower end 49 of the strut 35 and the rotary tube 42. The sleeve 50 is held firstly against an outwardly directed shoulder 51 at the lower end 47 of the rotary tube 42 and secondly against a step 52 in the lower end of the strut 35. The rotary sleeve 50 has a radially directed peg 55 shown in simplified form in the figures which engages in a hole 54 in the rotary tube 42 to disengage the top portion of the landing gear, eg. the strut, from the bottom portion, eg. the wheel-carrying cylinder. The sleeve 50 also has a radially directed lug 56 having a hole 57 machined therethrough to receive one end 58 of a link 59 by means of a pin 60, the other end 71 of the link 59 being articulated about an axis 61 to one end 66 of a second link 67 whose far end 68 is fixed to the lug 18 at the bottom end of the cylinder 5 by means of a pin 69 received in a hole 70 in the lug 18. The articulated links 59 and 67 constitute a pair of dividers interconnecting the sliding portion of the landing gear (ie. the cylinder 5) and the fixed portion thereof (ie. the rotary sleeve on the strut).

The landing gear further includes a fluid chamber 80 delimited by the outside wall 75 of the outer nested tube 3, the inside wall 77 of the strut 35, an outwardly projecting shoulder 81 on the outer tube 3 and suitable for sliding on the inside wall 77 of the strut 35, and the top end annulus 79 of the strut. The chamber 80 is sealed by sealing rings 83 and 84, with the sealing ring 83 being on the shoulder 81 and with the sealing ring 84 being on the annulus 79. The chamber 80 has a single inlet 85 leading to the hydraulic unit 28 which receives, as mentioned above the outlet 29 from the fluid chamber 34. The hydraulic unit is suitable for controlling the operating sequences of the landing gear, particularly during the kneeling down operation.

The operation of the landing gear is described below with reference to accompanying FIGS. 1 and 2.

Prior to landing, the helicopter landing gear is in the position shown in FIG. 1, ie. the cylinder 5 is fully extended on the rod 1 and the pair of dividers constituted by the links 59 and 67 forms an obtuse angle that is nearly flat. When the landing gear makes contact with the ground by means of the wheels (not shown) the cylinder 5 slides up the rod 1 between the nested tubes 2 and 3. This operation takes place progressively because of the throttling provided by the valves 21 at the end 22 of the inner nested tube 2. Thus, once the helicopter has come to rest on the ground, the cylinder 5 is thrust a certain distance into the rod 1 and remains in this position due to the weight of the helicopter. As a result the angle between the links 59 and 67 closes up somewhat.

The helicopter landing gear is then in a "static" position, ie. the only shortening it has suffered is due to its shock absorbing capabilities.

Figure 2:
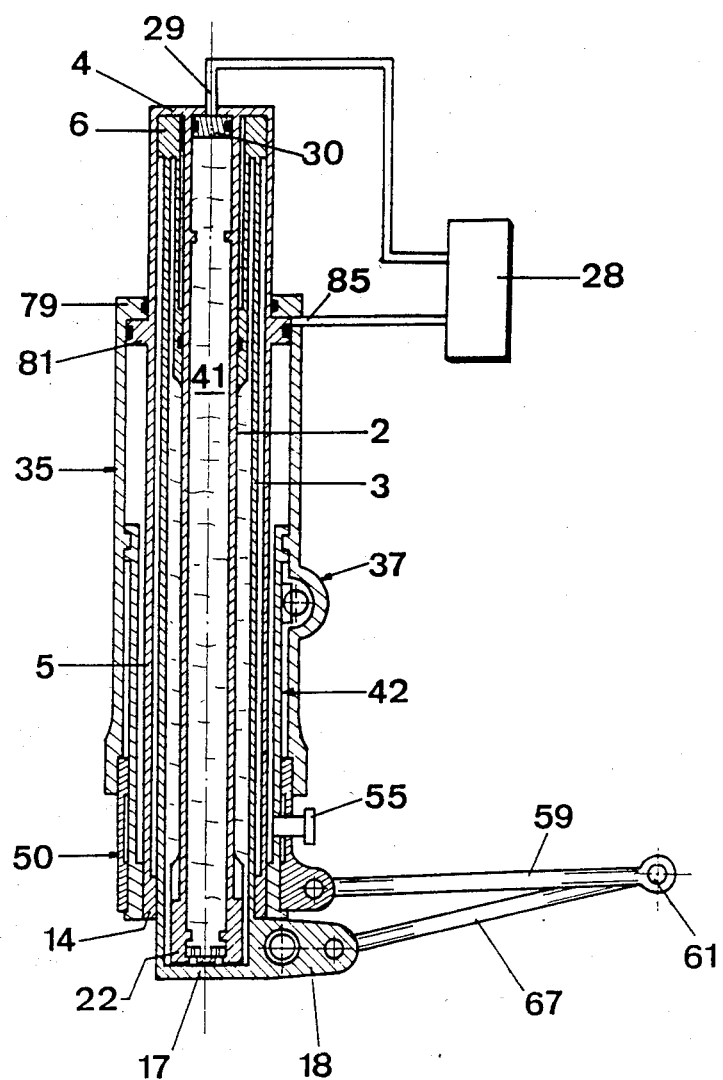
FIG. 2 is a diagrammatic longitudinal section through the same landing gear in the fully collapsed position.

In order to reduce the space occupied by the helicopter, and in particular to reduce its overall height so that it can be lodged in the hold of an aircraft carrier for example, the landing gear must be made to "kneel down" as shown in FIG. 2. The hydraulic unit 28 runs through a sequence of operations to achieve this effect. Hydraulic fluid is removed both from the chamber 34 at the top of the inner tube 2 and from the chamber 80 at the top of the strut 35. The result of emptying the chamber 34 is to reduce the pressure therein to substantially zero, thereby enabling the cylinder 5 to rise relative to the rod 1 until the top end 6 of the cylinder comes into contact with the top end plate 4 of the rod 1. The lug 18 on the cylinder 5 then makes contact with the bottom end 14 of the outer nested tube 3, thereby further closing the angle between the links 59 and 67. Once the pressure is removed from the chamber 80, the weight of the helicopter suffices to empty the fluid therefrom since the bottom end 22 of the rod 1 is now in contact with the end plate 17 of the cylinder 5 on which the wheels are mounted. Thus the shoulder 81 projecting from the outer nested tube comes into contact with the end annulus 79 of the strut 35. Each of the chambers 34 and 80 thus operates analogously to an actuator jack.

Once both of these chambers 34 and 80 are fully emptied, the landing gear is in the "kneeling down" position shown in FIG. 2, and the links 59 and 67 are at a very close angle to each other.

The landing gear also includes steering means, capable of operating equally well with the landing gear in the collapsed or "kneeling down" position or in the extended position, thereby enabling the landing gear to be steered so that the helicopter can be accurately parked. The operation of the steering gear is not described in detail since it is conventional and well known to the person skilled in the art, however in outline it operates as follows: hydraulic pressure is applied to one end or the other of the rack 38 thereby causing it to move one way or the other and thus rotating the rotary tube 42 by means of the pinion teeth 39 thereon which co-operate with the teeth of the ratchet.

In addition the landing gear is equipped with a rotary sleeve fitted with a peg 55 thus enabling the lower portion of the landing gear to be disengaged from the upper portion. Thus if it is desired for any reason to rotate the lower portion of the landing gear, ie. the cylinder 5 on which the wheels are mounted, the peg 55 is simply removed thus freeing the rotary tube to rotate relative to the sleeve. As can be seen, the drawing of the peg is highly diagrammatic. This enables the assembly comprising the rotary sleeve 50, the divider links 59, 67, and the cylinder 5 together with the running means mounted on the shaft 19 passing through the lug 18 at the bottom of the cylinder 5 to rotate freely through 360° about the main axis of the landing gear.

The above-described landing gear thus combines advantageous characteristics in a single unit, in particular it includes means both for steering and for kneeling down.

We claim:

1. In an aircraft landing gear having a shock absorber, comprising:
    a first and a second nested tube interconnected at one end by a common end plate, said first tube having a larger diameter than said second tube, and said first tube having on its outside lateral surface an outwardly projecting shoulder;
    shock absorber means comprising said nested tubes and a first cylinder slidably mounted between said nested tubes and cooperating therewith;
    a second cylinder disposed around said first tube having an annulus end plate around said first tube towards said one end and cooperating with said outwardly projecting shoulder to constitute therewith a jack and forming a pressure chamber therebetween, said pressure chamber being defined by said shoulder, said second cylinder, said first tube and said annulus end plate; and
    means connecting said pressure chamber to an hydraulic unit.

2. In the aircraft landing gear according to claim 1, comprising:
    a strut including said second cylinder and steering means, one end of said strut being suitable for fixing to the structure of an aircraft; and
    a rotary tube disposed between said strut and said first tube and suitable for cooperating with said steering means.

3. In the landing gear according to claim 2, including running means supported by said first cylinder; and means for disengaging in rotation said strut from said first cylinder, said disengaging means comprising a rotary sleeve and a peg suitable for cooperating with a hole in said rotary tube.

4. In the landing gear according to claim 3, including articulated links for connecting said rotary sleeve to said cylinder, and said articulated links including a pair of dividers.

5. In the landing gear according to claim 2, wherein said steering means comprise a rack fitted in said strut and cooperating with a circular toothed pinion portion on said rotary tube.

6. In the aircraft landing gear according to claim 1, wherein said jack additionally includes a second chamber defined by a separator piston free to move inside said second nested tube between an internally projecting shoulder in the tube and said common end plate, said second chamber having an orifice.

7. In the landing gear according to claim 6, wherein said connecting means is a feed inlet.

8. In the landing gear according to claim 7, wherein said feed inlet and said orifice are connected to a single hydraulic unit.

9. In an aircraft landing gear as claimed in claim 1, including a separator piston in said second nested tube, said second nested tube having an inwardly projecting shoulder cooperating with said common end plate for limiting the movement of said separator piston in said second nested tube.

10. In an aircraft landing gear as claimed in claim 9, including orifice means in a chamber formed between said separator piston and said common end plate within said second tube for withdrawal of fluid from the aforesaid chamber to enable an end of said first cylinder to rise and be guided within said first tube between said second tube.

11. In an aircraft landing gear as claimed in claim 1, wherein said first cylinder includes a first bearing surface and sealing means in sealing contact with said second nested tube and a second bearing sealing surface in sealing contact with said first nested tube.

12. In an aircraft landing gear as claimed in claim 1, including throttling means coupled to said second nested tube within said first cylinder closing off a fluid chamber therein.

13. In an aircraft landing gear as claimed in claim 1, including an end plate closing off one end of said first cylinder, and a projecting lug for supporting running gear shaft.

14. In an aircraft landing gear as claimed in claim 13, including throttling means associated with said second tube for defining, together with said end plate and bearing surfaces on the other end of said first cylinder, a fluid chamber.

15. In an aircraft landing gear as claimed in claim 1, wherein said annulus end plate includes a sealing ring thereon for sealing engagement with the outer surface of said first nested tube.

16. In an aircraft landing gear as claimed in claim 1, including a sealing ring on said outwardly projecting shoulder for sealing engagement with the inner surface of said second cylinder.

17. In an aircraft landing gear as claimed in claim 15, including a second sealing ring on said outwardly projecting shoulder for sealing engagement with the inner surface of said second cylinder and together with said sealing ring on said annulus end plate seals fluid within said pressure chamber.

* * * * *